US012625484B2

(12) United States Patent
Itsuki

(10) Patent No.: US 12,625,484 B2
(45) Date of Patent: May 12, 2026

(54) CONTROL SYSTEM FOR CONTROLLING A CONTROL TARGET BASED ON A COMMUNICATION ABNORMALITY AND COOLING SYSTEM

(71) Applicant: NIDEC CORPORATION, Kyoto (JP)

(72) Inventor: Makoto Itsuki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 426 days.

(21) Appl. No.: 18/172,313

(22) Filed: Feb. 22, 2023

(65) Prior Publication Data

US 2023/0273587 A1 Aug. 31, 2023

(30) Foreign Application Priority Data

Feb. 25, 2022 (JP) ................................. 2022-028522

(51) Int. Cl.
*G05B 19/05* (2006.01)
*G05B 23/02* (2006.01)
(52) U.S. Cl.
CPC ......... *G05B 19/058* (2013.01); *G05B 19/052* (2013.01); *G05B 23/0267* (2013.01)
(58) Field of Classification Search
CPC ............... G05B 19/058; G05B 19/052; G05B 23/0267; G05B 19/0428; G05B 19/4185; G05B 2219/32252
See application file for complete search history.

(56) References Cited

U.S. PATENT DOCUMENTS

| | | | | |
|---|---|---|---|---|
| 5,136,498 A | * | 8/1992 | McLaughlin | ....... G06F 11/2017 714/11 |
| 10,234,841 B2 | | 3/2019 | Annen et al. | |
| 2002/0184410 A1 | * | 12/2002 | Apel | ................... G06F 11/2017 710/5 |
| 2004/0024891 A1 | * | 2/2004 | Agrusa | .............. G05B 19/4185 709/201 |
| 2007/0080235 A1 | * | 4/2007 | Fulton | ................ G05D 23/1904 236/1 C |

(Continued)

FOREIGN PATENT DOCUMENTS

| | | | |
|---|---|---|---|
| JP | 2001-078534 A | 3/2001 |
| JP | 2008-181240 A | 8/2008 |

(Continued)

*Primary Examiner* — Robert E Fennema
*Assistant Examiner* — Marzia T Monty
(74) *Attorney, Agent, or Firm* — HAUPTMAN HAM, LLP

(57) ABSTRACT

A control system includes a first control device and a second control device. The first control device can control a control target. The first control device includes a first control unit, a first communication unit, a first monitoring unit, and a first determination unit. The first control unit can control the control target. The first communication unit can communicate with the control target. The first monitoring unit monitors communication between the second control device and the control target. The first determination unit determines execution or standby of control of the control target by the first control unit on the basis of a monitoring result of the first monitoring unit. The second control device includes a second control unit and a second communication unit. The second control unit can control the control target. The second communication unit can communicate with the control target.

9 Claims, 9 Drawing Sheets

(56) References Cited

U.S. PATENT DOCUMENTS

| | | | | |
|---|---|---|---|---|
| 2009/0287866 A1* | 11/2009 | Mejias | ................ | H04L 12/2816 |
| | | | | 710/110 |
| 2017/0277607 A1* | 9/2017 | Samii | .................. | G06F 11/2033 |
| 2018/0092235 A1* | 3/2018 | Mielnik | ............. | H01R 12/7058 |
| 2018/0225244 A1* | 8/2018 | Dorneanu | ............. | G06F 13/374 |
| 2018/0374339 A1* | 12/2018 | Nagasaka | ................ | H04N 5/00 |

FOREIGN PATENT DOCUMENTS

| | | | |
|---|---|---|---|
| JP | 2014-106862 A | 6/2014 |
| JP | 2015-172895 A | 10/2015 |
| JP | 2016-058009 A | 4/2016 |

* cited by examiner

CONTROL SYSTEM FOR CONTROLLING A CONTROL TARGET BASED ON A COMMUNICATION ABNORMALITY AND COOLING SYSTEM

CROSS-REFERENCE TO RELATED APPLICATIONS

The present invention claims priority under 35 U.S.C. § 119 to Japanese Patent Application No. 2022-028522 filed on Feb. 25, 2022, the entire content of which is incorporated herein by reference.

FIELD OF THE INVENTION

The present invention relates to a control system and a cooling system.

BACKGROUND

In a conventional duplication system, a programmable logic controller that controls slave equipment communicates with another programmable logic controller that is a duplicated counterpart to monitor a state of the other programmable logic controller. In a case where the own station is a standby system, upon detecting a failure in another programmable logic controller, the programmable logic controller switches the own station to a control system.

In the above-described conventional duplication system, one programmable logic controller communicates with another programmable logic controller to detect a failure of the other programmable logic controller. Therefore, for example, in a state where the programmable logic controller of the control system is controlling slave equipment, when the other programmable logic controller in which the failure has occurred is removed from the duplication system, communication is disabled between the programmable logic controllers, and the duplication system may become unstable.

SUMMARY

An exemplary control system of the present disclosure includes a first control device and a second control device. The first control device can control a control target. The first control device includes a first control unit, a first communication unit, a first monitoring unit, and a first determination unit. The first control unit can control the control target. The first communication unit can communicate with the control target. The first monitoring unit monitors communication between the second control device and the control target. The first determination unit determines execution or standby of control of the control target by the first control unit on the basis of a monitoring result of the first monitoring unit. The second control device includes a second control unit and a second communication unit. The second control unit can control the control target. The second communication unit can communicate with the control target.

An exemplary cooling system of the present disclosure cools electronic equipment. An exemplary cooling system of the present disclosure includes a cooling device and a control system. The cooling device cools the electronic equipment. The control system controls the cooling device as the control target.

The above and other elements, features, steps, characteristics and advantages of the present disclosure will become more apparent from the following detailed description of the preferred embodiments with reference to the attached drawings.

DETAILED DESCRIPTION

Figure 1:
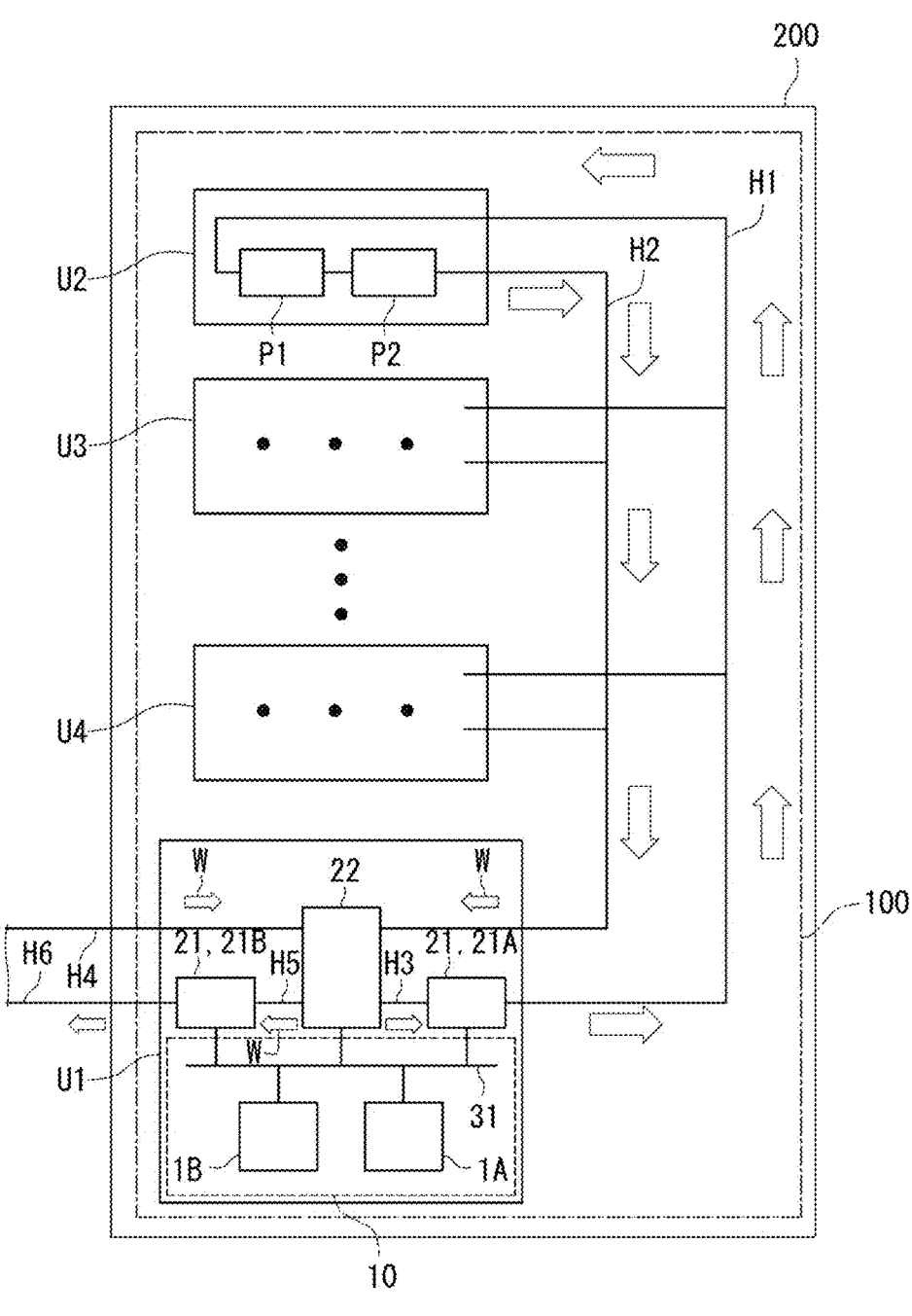
FIG. 1 is a view showing an outline of a cooling system of an exemplary embodiment.

Hereinafter, an exemplary embodiment of the present disclosure will be described with reference to the accompanying drawings. In the drawings, the same or corresponding parts are denoted by the same reference numerals, and the description will not be repeated.

With reference to FIG. 1, a cooling system 100 having a control system 10 of the exemplary embodiment will be described. FIG. 1 is a view showing an outline of the cooling system 100.

The cooling system 100 cools a server 200. The server 200 is an example of electronic equipment. As an example, the server 200 includes the cooling system 100 and three server units U2, U3, and U4. The number of server units included in the server 200 is not limited to three. The cooling system 100 may be provided other than the server 200.

The cooling system 100 includes a cooling distribution unit (CDU) U1, a manifold H1, a manifold H2, a cold plate P1, and a cold plate P2. As an example, the cooling distribution unit U1 includes the control system 10, a pump device 21A, a valve device 21B, and a heat exchanger 22. The pump device 21A sucks a refrigerant and discharges the refrigerant. The valve device 21B adjusts the flow rate of the refrigerant. The pump device 21A and the valve device 21B are each an example of a cooling device 21.

The pump device 21A is connected to the manifold H1, for example, and to the manifold H2 via a flow channel H3 and the heat exchanger 22. The heat exchanger 22 is further connected to a cooling tower (not illustrated) via a flow channel H5, the valve device 21B, and a flow channel H6. The flow channel H3 is, for example, a pipe through inside of which a refrigerant flows. Flow channels H4, H5, and H6 are pipes through inside of which liquid other than the refrigerant such as water W, for example, flows. The water W circulates between the heat exchanger 22 and the cooling tower. Specifically, the water W returns from the cooling tower to the cooling tower via the flow channel H4, the heat exchanger 22, the flow channel H5, the valve device 21B, and the flow channel H6. The arrangement of the pump device 21A, the valve device 21B, and the heat exchanger 22 in the cooling distribution unit U1 is as in the example, and the pump device 21A, the valve device 21B, and the heat exchanger 22 may be arranged as other than the above.

The cooling distribution unit U1 supplies the refrigerant to the manifold H1. In the cooling distribution unit U1, the control system 10 controls the pump device 21A and the valve device 21B. For example, the pump device 21A includes a control unit that controls rotation of the pump. For example, the valve device 21B includes a control unit that controls opening and closing of the valve. The control unit includes a processor such as a central processing unit (CPU). The pump device 21A supplies the refrigerant to the manifold H1 under the control of the control system 10. The valve device 21B adjusts the flow rate of the water W circulating between the heat exchanger 22 and the cooling tower under the control of the control system 10. The control of the control system 10 will be described below.

The manifold H1 is, for example, a pipe that connects the pump device 21A of the cooling distribution unit U1 and the server units U2, U3, and U4. The refrigerant passes through inside the manifold H1. The manifold H1 distributes and supplies the refrigerant supplied from the pump device 21A of the cooling distribution unit U1 to the server units U2, U3, and U4. The refrigerant supplied to each of the server units U2, U3, and U4 passes through inside each of the server units U2, U3, and U4 and is supplied to the manifold H2.

The cold plates P1 and P2 receive heat from a heat generating component (not illustrated) and cool the heat generating component. The heat generating component is, for example, an arithmetic device such as a CPU, a storage device such as a memory, or the like. The refrigerant flows in the cold plates P1 and P2 when passing through inside the server units U2, U3, and U4. For example, the refrigerant exchanges heat in the cold plates P1 and P2, whereby the refrigerant having heat circulates in the cooling system 100.

The manifold H2 is, for example, a pipe that connects the heat exchanger 22 of the cooling distribution unit U1 and the server units U2, U3, and U4. The refrigerant passes through inside the manifold H2. The manifold H2 joins the refrigerant that has passed through each of the server units U2, U3, and U4 and supplies the joined refrigerant to the cooling distribution unit U1. The refrigerant supplied to the cooling distribution unit U1 passes through the heat exchanger 22, for example. When passing through the heat exchanger 22, the refrigerant is cooled by heat exchange with the water W. The refrigerant that has passed through the heat exchanger 22 is supplied to the manifold H1 by the pump device 21A. On the other hand, the water W having received heat from the refrigerant is discharged in the cooling tower. As described above, in the cooling system 100, the refrigerant circulates through the cooling distribution unit U1, the manifold H1, the server units U2, U3, and U4, and the manifold H2. In FIG. 1, the circulation of the refrigerant is indicated by an arrow. The refrigerant may circulate in opposite directions.

Figure 2:
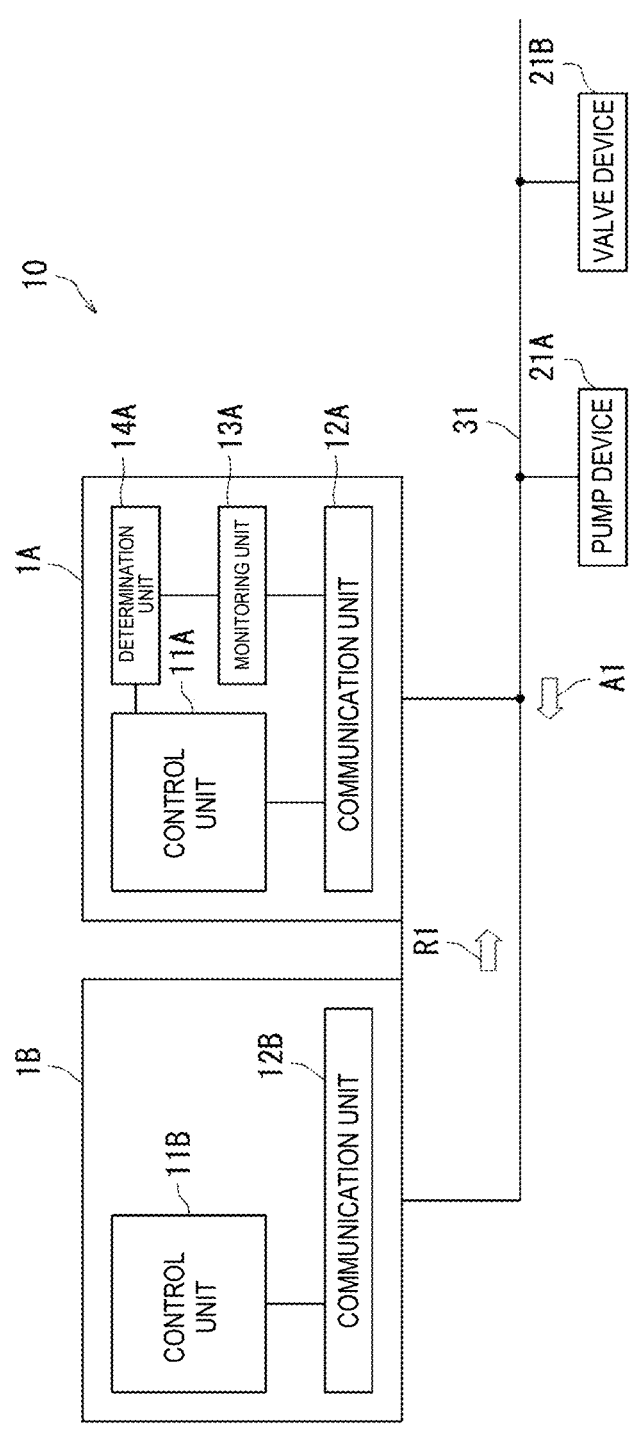
FIG. 2 is an example of a functional block diagram of a control system of the exemplary embodiment.

Next, the control system 10 of the exemplary embodiment will be described with reference to FIG. 2. FIG. 2 is an example of a functional block diagram of the control system of the exemplary embodiment.

The control system 10 includes a control device 1A and a control device 1B. The control device 1A and the control device 1B can control the pump device 21A and the valve device 21B. For example, the control device 1A, the pump device 21A, and the valve device 21B are connected to a serial bus 31. That is, the control device 1A is bus-connected to each of the pump device 21A and the valve device 21B. The control device 1B is bus-connected to each of the pump device 21A and the valve device 21B via the serial bus 31. The serial bus 31 is, for example, a bus cable.

The control device 1A and the control device 1B can transmit a control instruction R1 for controlling each of the pump device 21A and the valve device 21B to each of the pump device 21A and the valve device 21B via the serial bus 31. For example, the control unit of the pump device 21A receives the control instruction R1 from the control device 1A or the control device 1B, and controls the rotation of the pump of the pump device 21A in accordance with the control instruction R1. For example, the control unit of the valve device 21B receives the control instruction R1 from the control device 1A or the control device 1B, and controls opening and closing of the valve of the valve device 21B.

In the present embodiment, when one of the control device 1A and the control device 1B controls the pump device 21A and the valve device 21B, the other of the control device 1A and the control device 1B stands by without controlling the pump device 21A and the valve device 21B. For example, the control device 1B can control the pump device 21A and the valve device 21B. The control device 1A stands by without controlling the pump device 21A and the valve device 21B. The control device 1A is an example of the first control device. The control device 1B is an example of the second control device. Hereinafter, a state in which the control device 1A and the control device 1B are controlling the pump device 21A and the valve device 21B is called a control state, and a state in which the control device 1A and the control device 1B are on standby is called a standby state.

The control device 1B includes a control unit 11B and a communication unit 12B. The control unit 11B controls the pump device 21A and the valve device 21B. The control unit 11B includes a processor such as a CPU. The control device 1B may include a storage unit that stores data and a computer program. Specifically, the storage unit includes a main storage device such as a semiconductor memory, and an auxiliary storage device such as a semiconductor memory, a solid state drive, and/or a hard disk drive. The storage unit may include a removable medium. For example, the control unit 11B generates the control instruction R1. The communication unit 12B can communicate with the pump device 21A and the valve device 21B. When the control unit 11B controls the pump device 21A and the valve device 21B, the communication unit 12B transmits the control instruction R1 generated by the control unit 11B to the pump device 21A or the valve device 21B via the serial bus 31. The communication unit 12B can receive various signals transmitted from the pump device 21A or the valve device 21B via the serial bus 31.

The control device 1A includes a control unit 11A and a communication unit 12A. The configuration and function of the control unit 11A are the same as those of the control unit 11B. The function of the communication unit 12A is the same as that of the communication unit 12B. The control device 1A further includes a monitoring unit 13A and a determination unit 14A. The monitoring unit 13A monitors communication between the control device 1B and the pump device 21A and communication between the control device 1B and the valve device 21B. The determination unit 14A determines execution or standby of control of the pump device 21A and the valve device 21B by the control unit 11A on the basis of the monitoring result of the monitoring unit 13A.

In the present embodiment, an address that is unique identification information is set in each of the control device 1A, the control device 1B, the pump device 21A, and the valve device 21B. Specifically, the address is an IP address, a MAC address, or the like. The control device 1A and the control device 1B specify one of the pump device 21A and the valve device 21B on the basis the address. Therefore, in the present embodiment, one control device can control the plurality of cooling devices 21.

For example, when transmitting the control instruction R1 to the pump device 21A or the valve device 21B, the communication unit 12B transmits the control instruction R1 to a broadcast address. As a result, the control instruction R1 transmitted from the communication unit 12B is received by the control device 1A, the pump device 21A, and the valve device 21B. For example, the control instruction R1 includes a source address and a destination address. In the example shown in FIG. 2, the source address is the address of the control device 1B, which is the transmission source of the control instruction R1. The destination address is the address of the pump device 21A or the valve device 21B specified by the control device 1A. In the following example, an example in which the pump device 21A is representatively selected will be described. The control instruction R1 may include information indicating a transmission source of the control instruction other than the source address, and may include information indicating a destination of the control instruction other than the destination address.

The control unit of the pump device 21A receives the control instruction R1 transmitted from the communication unit 12B, and controls the pump device 21A in accordance with the control instruction R1. Specifically, upon receiving the control instruction R1 transmitted from the communication unit 12B, the control unit of the pump device 21A specifies the destination of the control instruction R1 on the basis of the destination address included in the control instruction R1. Since the destination address indicates the pump device 21A, the control unit of the pump device 21A controls the pump device 21A in accordance with the control instruction R1.

For example, upon controlling the pump of the pump device 21A, the control unit of the pump device 21A generates control information A1 indicating a control result and the like. The control unit of the pump device 21A transmits the generated control information A1 to the source address included in the control instruction R1.

On the other hand, the control unit of the valve device 21B receives the control instruction R1 transmitted from the communication unit 12B, and specifies the destination of the control instruction R1 on the basis of the destination address included in the control instruction R1. Since the destination address indicates the pump device 21A, the control unit of the valve device 21B stands by without controlling the valve device 21B.

The monitoring unit 13A detects communication between the control device 1A and each of the pump device 21A and the valve device 21B. Specifically, in the control device 1A, the communication unit 12A receives the control instruction R1 transmitted from the communication unit 12B. The monitoring unit 13A acquires the control instruction R1 received by the communication unit 12A. The monitoring unit 13A specifies the transmission source of the control instruction R1 on the basis of the source address included in the acquired control instruction R1. As a result, the monitoring unit 13A determines that the control device 1B is in the control state.

When the monitoring unit 13A determines that the control device 1B is in the control state, the determination unit 14A determines continuation of the standby state of the control device 1A. Therefore, in the control system 10, the control of the pump device 21A and the valve device 21B by the control device 1B is continued.

Figure 3:
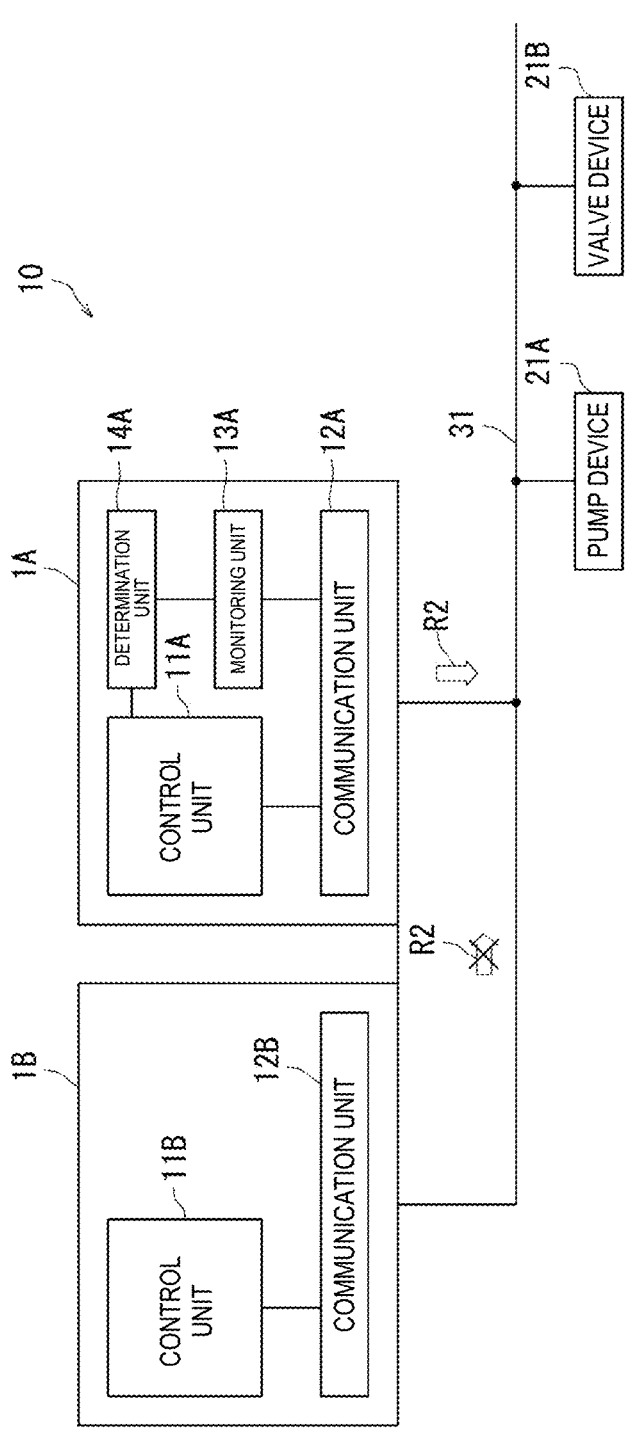
FIG. 3 is a view showing switching of control devices in the control system.

Next, switching of the control devices in the control system 10 will be described with reference to FIG. 3. FIG. 3 is a view showing switching of the control devices in the control system.

If a next control instruction R2 is not transmitted from the communication unit 12B during a predetermined period after the control instruction R1 is transmitted from the communication unit 12B, the communication unit 12A cannot receive the control instruction. That is, the monitoring unit 13A cannot detect communication between the control device 1A and each of the pump device 21A and the valve device 21B. As a result, the monitoring unit 13A determines that the control of the pump device 21A and the valve device 21B by the control device 1B is stopped.

When the monitoring unit 13A determines that the control of the pump device 21A and the valve device 21B by the control device 1B is stopped, the determination unit 14A determines start of execution of the control of the pump device 21A and the valve device 21B by the control unit 11A. The control unit 11A starts control of the pump device 21A and the valve device 21B in accordance with the determination of the determination unit 14A. For example, the control unit 11A transmits the control instruction R2 to the pump device 21A.

As described above, when the control device 1A cannot detect communication between the control device 1B and each of the pump device 21A and the valve device 21B, the control device 1A controls the pump device 21A and the valve device 21B in place of the control device 1B, so that the control system 10 can have redundancy. Since the control device 1A in the standby state does not transmit a control instruction, it becomes possible to perform hot swapping from the serial bus 31. Therefore, in the control system 10, it is possible to replace the control device 1A while continuing the control of the pump device 21A and the valve device 21B, and maintenance becomes easy.

Figure 4:
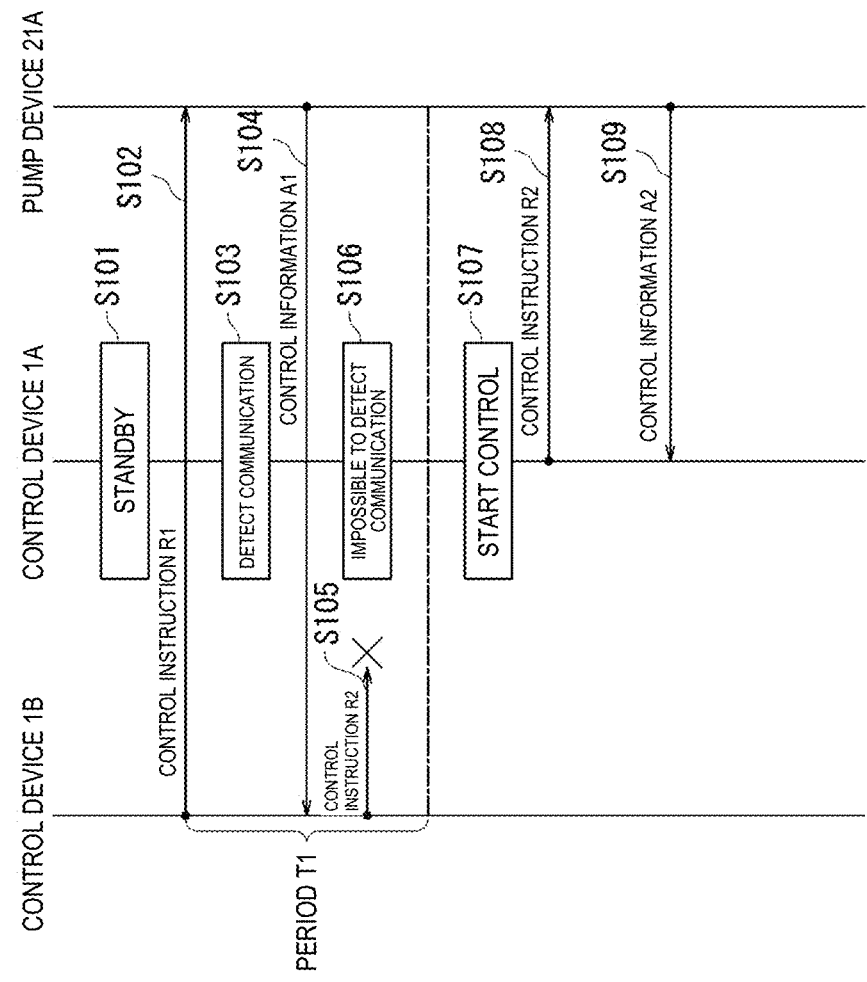
FIG. 4 is a sequence diagram showing control processing of the exemplary embodiment.

Next, the control processing in the control system 10 of the exemplary embodiment will be described with reference to FIG. 4. FIG. 4 is a sequence diagram showing control processing of the exemplary embodiment. FIG. 4 representatively shows the processing of the control device 1A, the control device 1B, and the pump device 21A.

The control device 1B controls the pump device 21A. The control device 1A stands by without controlling the pump device 21A (step S101). The control device 1B transmits the control instruction R1 to the pump device 21A (step S102).

The control device 1A detects communication between the control device 1B and the pump device 21A (step S103). The control device 1A continues the standby state.

The pump device 21A receives the control instruction R1. The pump device 21A controls the pump device 21A in accordance with the control instruction R1 to generate the control information A1 indicating a control result and the like. The pump device 21A transmits the generated control information A1 to the control device 1B (step S104).

When the control device 1B does not transmit the control instruction R2 before a predetermined period T1 elapses after the control device 1B transmits the control instruction R1 (step S105), the control device 1A cannot detect the communication between the control device 1B and the pump device 21A (step S106).

The control device 1A determines start of execution of control of the pump device 21A (step S107). The control device 1A transmits the control instruction R2 to the pump device 21A (step S108). The pump device 21A receives the control instruction R2. The pump device 21A controls the pump device 21A in accordance with the control instruction R2 to generate control information A2 indicating a control result. The pump device 21A transmits the generated control information A2 to the control device 1A (step S109).

Figure 5:
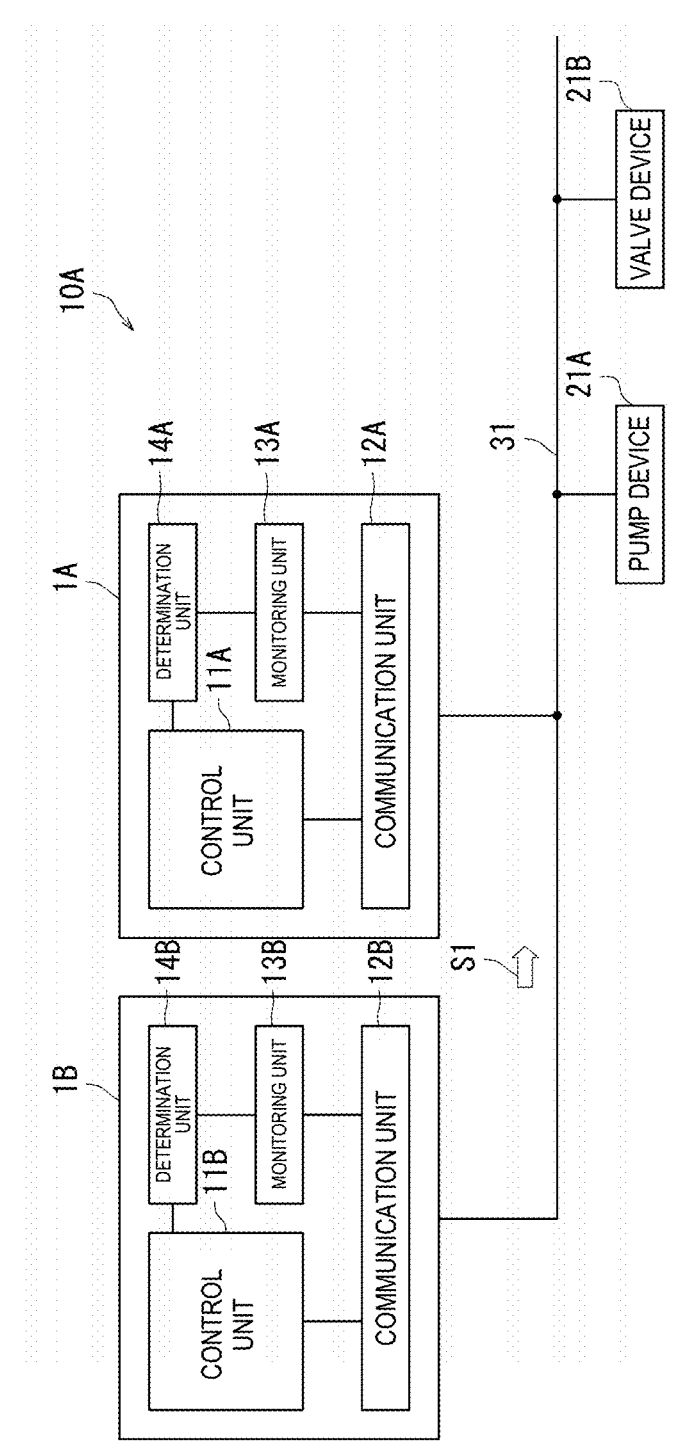
FIG. 5 is another example of a functional block diagram of the control system of the exemplary embodiment.

Next, another example of the control system of the exemplary embodiment will be described with reference to FIG. 5. FIG. 5 is another example of a functional block diagram of the control system of the exemplary embodiment. The control system 10A is different from the control system 10 shown in FIGS. 2 and 3 in the configuration of the control device 1B. Specifically, the control device 1B further includes a monitoring unit 13B and a determination unit 14B. The monitoring unit 13B monitors communication between the control device 1A and the pump device 21A and communication between the control device 1A and the valve device 21B. The determination unit 14B determines execution of control of the pump device 21A and the valve device 21B by the control unit 11B on the basis of the monitoring result of the monitoring unit 13B.

In the control system 10A, any one of the control device 1A and the control device 1B is determined as a control device that controls the pump device 21A and the valve device 21B.

Figure 6:
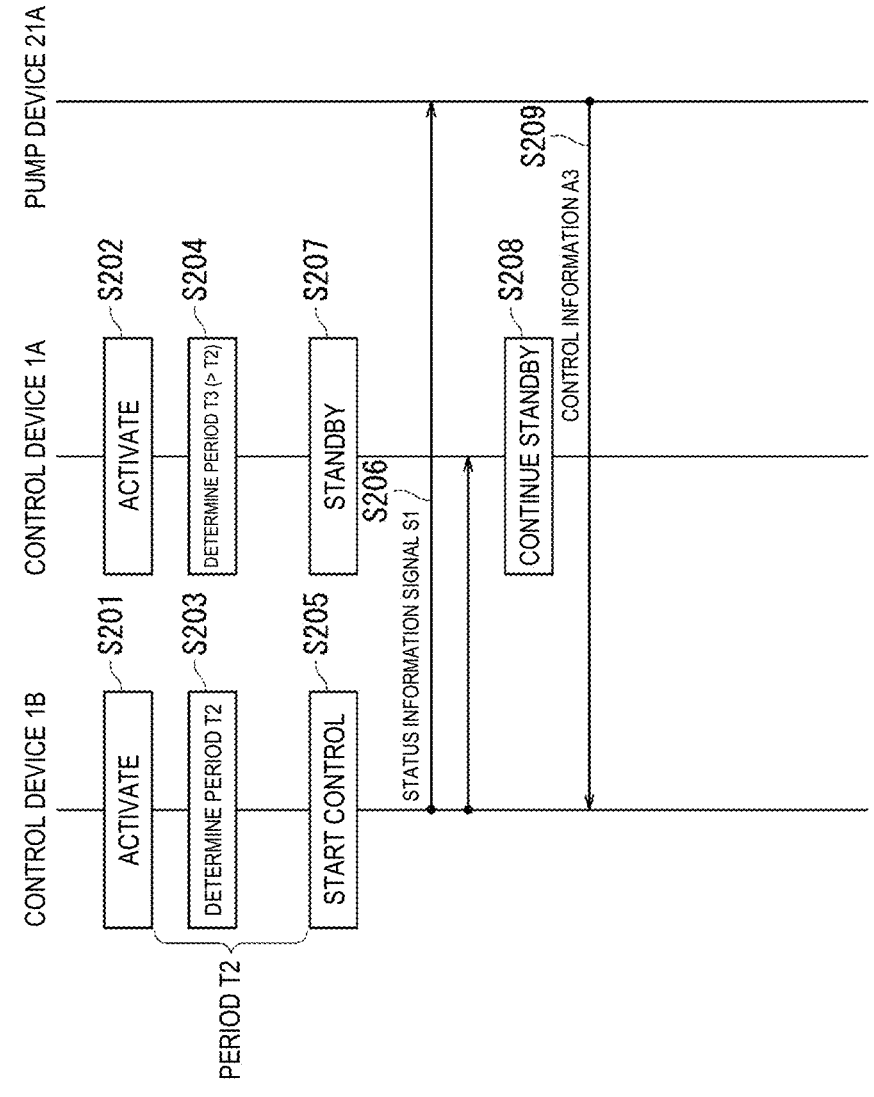
FIG. 6 is a sequence diagram showing determination processing of the control device in the control system of the exemplary embodiment.

Next, the determination processing of the control device that controls the pump device 21A and the valve device 21B in the control system 10A will be described with reference to FIGS. 5 and 6. FIG. 6 is a sequence diagram showing the determination processing of the control device in the control system of the exemplary embodiment. FIG. 6 representatively shows the processing of the control device 1A, the control device 1B, and the pump device 21A.

For example, when the control system 10A is activated, the control device 1A is activated (step S201), and the control device 1B is activated (step S202). When the control device 1B is activated, the control unit 11B determines a predetermined period T2 (step S203). When the control device 1A is activated, the control unit 11A determines a predetermined period T3 (step S204). The predetermined period T2 and the predetermined period T3 are randomly determined on the basis of random numbers, for example. The predetermined period T2 and the predetermined period T3 are examples of standby time. For example, random numbers are generated by a random number generation algorithm or the like. Specifically, the storage units of the control unit 11A and the control unit 11B each store in advance a random number sequence generated on the basis of the random number generation algorithm. The control unit 11B acquires one value in the random number sequence and determines the predetermined period T2 corresponding to the acquired value. On the other hand, the control unit 11A acquires one value in the random number sequence and determines the predetermined period T3 corresponding to the acquired value. In the example of FIG. 6, the predetermined period T2 is shorter than the predetermined period T3.

The random number includes a pseudo random number. The random number sequence may be generated when the control device 1A and the control device 1B are activated, in addition to being stored in advance in the storage unit. The random number may be, for example, a random number table.

When the predetermined period T2 elapses after the control device 1B is activated, the control device 1B starts the control of the pump device 21A (step S205). In other words, the control device 1B is in the standby state until the predetermined period T2 elapses after activation. Specifically, when the predetermined period T2 elapses after the control device 1B is activated, the control unit 11B generates a status information signal S1 including status information indicating the state of the control device 1B. The status information is information indicating activation of the control device 1B, for example. The status information may be, for example, information indicating that the control device 1B is normal, information indicating that the control device 1B is abnormal, or the like.

On the other hand, since the predetermined period T3 has not elapsed after the control device 1A is activated, the control device 1A stands by without starting the control of the pump device 21A (step S206). In other words, the control device 1A is in the standby state after activation.

The communication unit 12B of the control device 1B transmits the status information signal S1 generated by the control unit 11B to the control device 1A and the pump device 21A. That is, the control device 1B transitions from the standby state to the control state. For example, the status information signal S1 includes the source address and the destination address. Specifically, the communication unit 12B sets the addresses of the control device 1A and the pump device 21A as the destination addresses, and transmits the status information signal S1 in which the source address indicating the control device 1B is set. The control device 1A receives the status information signal S1 transmitted from the communication unit 12B. The pump device 21A receives the status information signal S1 transmitted from the communication unit 12B (step S204).

With reference to the source address of the received status information signal S1, the pump device 21A determines that the transmission source of the status information signal S1 is the control device 1B. Therefore, the pump device 21A determines that the control device 1B is the control device that controls the pump device 21A. As a result, communication between the pump device 21A and the control device 1A becomes unnecessary, and the communication amount in the serial bus 31 can be reduced, and therefore the stability of the control system 10 is improved.

In the control device 1A, when the monitoring unit 13A detects the status information signal S1 transmitted by the communication unit 12B, the determination unit 14A determines standby for the control of the pump device 21A by the control unit 11A. Specifically, the communication unit 12A receives the status information signal S1 transmitted from the communication unit 12B of the control device 1B. The monitoring unit 13A acquires the status information signal S1 received by the communication unit 12A. The monitoring unit 13A specifies the transmission source of the status information signal S1 as the control device 1B on the basis of the source address included in the acquired status information signal S1.

When the monitoring unit 13A acquires the status information signal S1, the determination unit 14A determines standby for the control of the pump device 21A by the control unit 11A. That is, the control unit 11A continues the standby state.

As described above, on the basis of transmission of the status information signal, one control device transitions to the control state and another control device transitions to the standby state, whereby the control device immediately after activation can be easily set to the control state or the standby state. Since only one control device communicates with the pump device 21A, responsiveness of the pump device 21A with respect to the control device in the control state is improved.

In the present embodiment, the transmission timing of the status information signal is randomly set. Therefore, in a case where the control system 10 includes a plurality of control devices, it is possible to make setting of the transmission timing for each control device unnecessary, and it becomes easy to avoid overlapping of the transmission timings in the plurality of control devices. As a result, it becomes easy to prevent the plurality of control devices from simultaneously transitioning to the control state.

In the present embodiment, the predetermined period T2 is shorter than the predetermined period T3, but the predetermined period T2 may be longer than the predetermined period T3. In this case, the processing of the control device 1A and the control device 1B are reversed.

Figure 7:
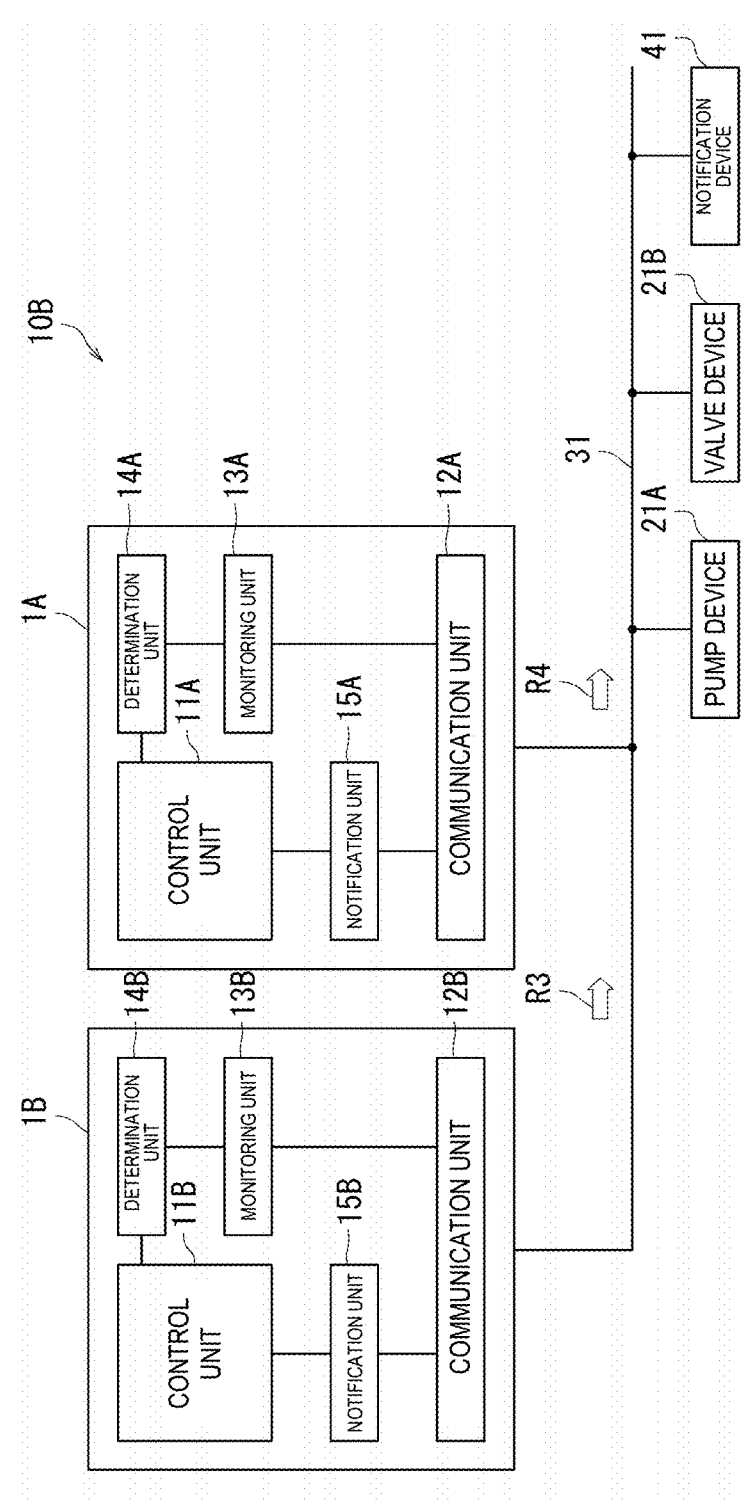
FIG. 7 is another example of a functional block diagram of the control system of the exemplary embodiment.

Next, notification in the control system will be described with reference to FIG. 7. FIG. 7 is another example of a functional block diagram of the control system of the exemplary embodiment. The control system 10B is different from the control system 10A shown in FIG. 5 in the configurations of the control device 1A and the control device 1B. The control system 10B further includes a notification device 41.

The control device 1A further includes a notification unit 15A. The control device 1B further includes a notification unit 15B. The notification unit 15A notifies control statuses of the pump device 21A and the valve device 21B by the control unit 11A. The notification unit 15B notifies control statuses of the pump device 21A and the valve device 21B by the control unit 11B.

For example, the notification device 41 is a device that makes a sound, a device that displays with light, or the like. The notification device 41 is connected to the serial bus 31. That is, each of the control device 1A and the control device 1B is bus-connected to the notification device 41. The control device 1A and the control device 1B control the notification device 41 via the serial bus 31.

As described above, for example, the administrator of the server 200 can easily understand the control status of the control system 10 by the notification units 15A and 15B and the notification device 41. For example, the administrator can more easily understand which of the control device 1A and the control device 1B is in the control state.

Figure 8:
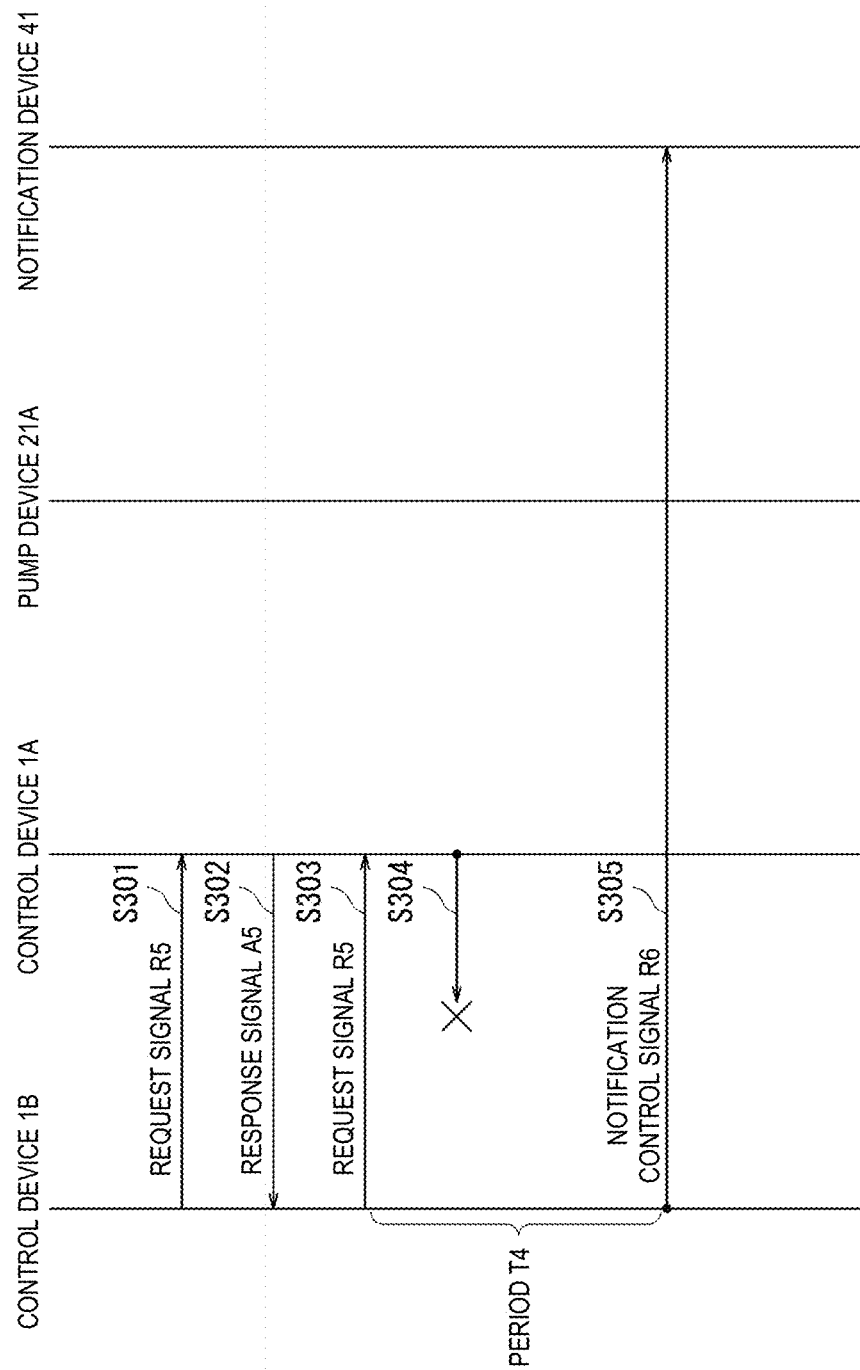
FIG. 8 is a sequence diagram showing notification processing in the control system.

Next, another example of the notification processing in the control system will be described with reference to FIGS. 7 and 8. FIG. 8 is a sequence diagram showing the notification processing in the control system.

In the present embodiment, the control device in the control state detects an abnormality of the control device in the standby state.

For example, when the control device 1B is in the control state, the control device 1B transmits a request signal R5 for requesting a response to the control device 1A in the standby state. Specifically, the control unit 11B generates the request signal R5 regularly or irregularly after activation. The request signal R5 is, as an example, ping or the like for communication check. The communication unit 12B transmits the request signal R5 generated by the control unit 11B to the control device 1A. The communication unit 12A of the control device 1A receives the request signal R5 transmitted from the control device 1B (step S301).

The communication unit 12A transmits a response signal A5 responsive to the request signal R5 to the control device 1B, which is the transmission source of the request signal R5. The communication unit 12B of the control device 1B receives the response signal A5 transmitted from the control device 1A (step S302).

For example, the monitoring unit 13B detects the response signal A5. Specifically, the monitoring unit 13B acquires the response signal A5 received by the communication unit 12B. As a result, the monitoring unit 13B determines that the control device 1A is normal.

On the other hand, in a case where (step S304) the communication unit 12B does not receive the response signal A5 within a predetermined period T4 after the request signal R5 is transmitted by the communication unit 12B (step S303), the monitoring unit 13B determines that the control device 1A is abnormal.

When the monitoring unit 13B determines that the control device 1A is abnormal, the notification unit 15B generates a notification control signal R6, and transmits the notification control signal R6 to the notification device 41 via the communication unit 12B and the serial bus 31 (step S305). The notification control signal R6 is a signal instructing constant lighting of LED equipment L1 in a lighting color different from the lighting color for the control state, for example. Upon receiving the notification control signal R6, the notification device 41 performs processing in accordance with the notification control signal R6. As described above, the control device in the control state can determine whether the control device in the standby state is normal or abnormal. As a result, it becomes easy to prevent an abnormal control device from being brought into the control state. The determination result by the control device in the control state is notified by the notification device 41. Therefore, the administrator of the server 200 can easily understand the abnormality of the control device in the standby state.

Figure 9:
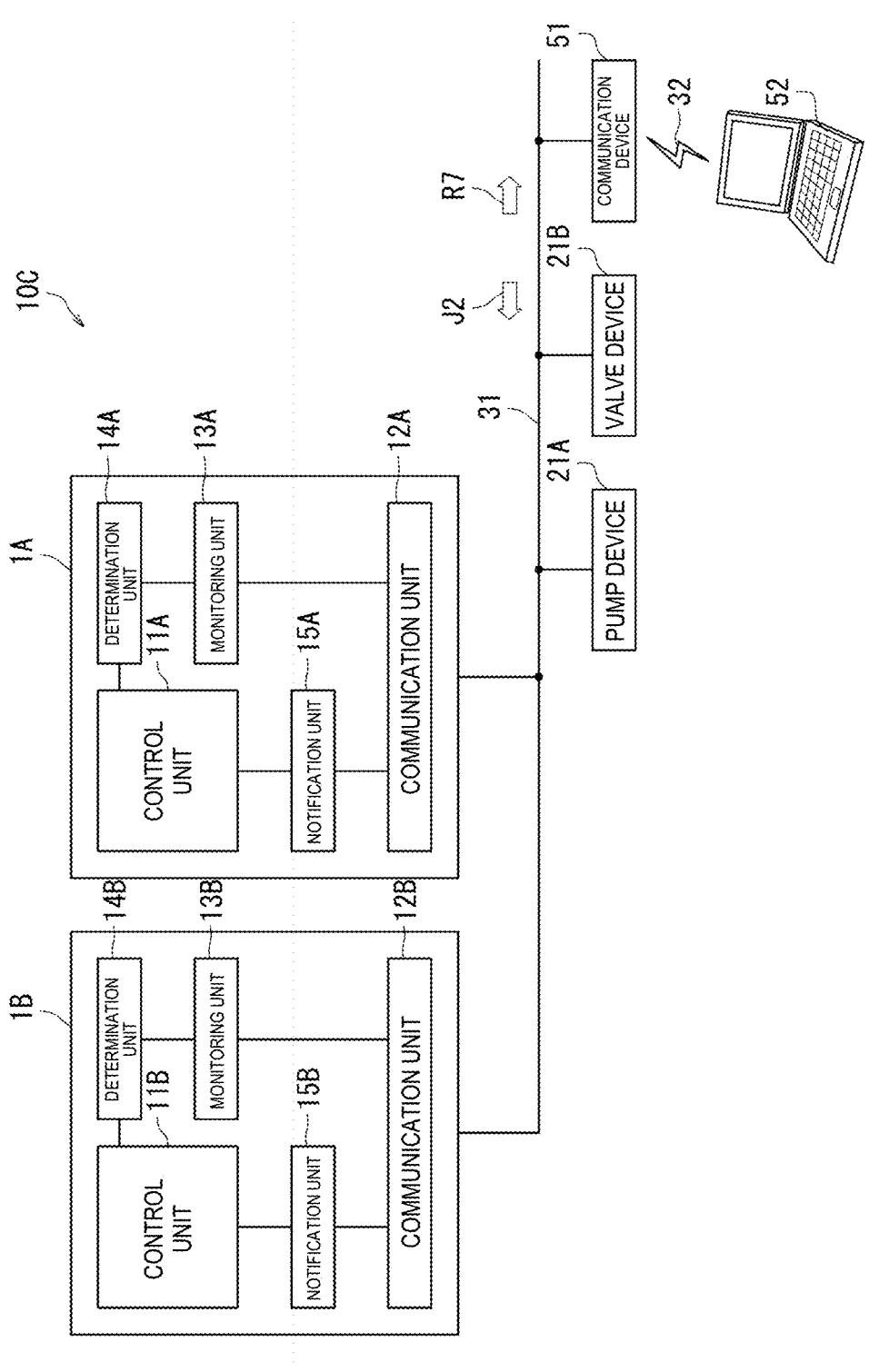
FIG. 9 is another example of a functional block diagram of the control system of the exemplary embodiment.

Next, another example of the control system of the exemplary embodiment will be described with reference to FIG. 9. FIG. 9 is another example of a functional block diagram of the control system of the exemplary embodiment. A control system 10C includes a communication device 51 in place of the notification device 41 as compared with the control system 10B shown in FIG. 7.

The communication device 51 is connected to the serial bus 31. That is, each of the control device 1A and the control device 1B is bus-connected to the communication device 51.

The communication device 51 is connected to a network 32. The network 32 includes, for example, the Internet, a local area network (LAN), a public telephone network, and a short-range wireless network. The communication device 51 is a communication device, for example, a network interface controller. Various types of pieces of communication equipment (for example, a router, a bridge, an access point, a hub, and a repeater) are connected to the network 32. The communication device 51 is, for example, a wireless communication module that performs wireless communication, a wired communication module that performs wired communication, or a wireless communication module that executes near field communication. For example, the near field communication is wireless communication having a communication distance of about several meters to several tens of meters. The near field communication is, for example, communication conforming to a communication standard by Bluetooth (registered trademark), ZigBee (registered trademark), or WiFi.

The communication device 51 can communicate with a terminal device 52 outside the server 200 via the network 32. The communication device 51 is an example of the external equipment.

For example, the control device 1A and the control device 1B communicate with the terminal device 52 via the communication device 51. Therefore, the control device 1A and the control device 1B can transmit various types of information to the terminal device 52 and give instructions from the terminal device 52 to the control device 1A and the control device 1B.

Specifically, the terminal device 52 functions as the notification device 41. In a case where the terminal device 52 functions as the notification device 41, the notification unit 15A or the notification unit 15B generates a notification control signal R7 and transmits the signal to the communication device 51 via the communication unit 12A or the communication unit 12B and the serial bus 31. The notification control signal R7 includes, for example, information J1 related to the states of the control device 1A and the control device 1B and the address of the terminal device 52. Upon receiving the notification control signal R7, the communication device 51 acquires the information J1 and the address of the terminal device 52 from the notification control signal R7. The communication device 51 transmits the information J1 to the address of the terminal device 52 via the network 32. The terminal device 52 receives the information J1 transmitted from the communication device 51, and displays, for example, a display screen corresponding to the information J1 on a display unit included in the terminal device 52.

The terminal device 52 functions as an input device that inputs instructions to the control device 1A and the control device 1B. For example, when the administrator inputs a control instruction of the pump device 21A to the terminal device 52, the terminal device 52 generates information J2 including a control instruction and the addresses of the control device 1A and the control device 1B, and transmits the information J2 to the communication device 51 via the network 32. Upon receiving the information J2 transmitted from the terminal device 52, the communication device 51 acquires the control instruction and the addresses of the control device 1A and the control device 1B from the information J2. The communication device 51 transmits a control instruction to the addresses of the control device 1A and the control device 1B via the serial bus 31. The control device 1A and the control device 1B receive a control instruction from the communication device 51. For example, any one of the control device 1A and the control device 1B in the control state transmits the received control instruction to the pump device 21A via the serial bus 31.

As described above with reference to FIGS. 1 to 9, in the cooling system 100, one of the control device 1A and the control device 1B of the control system 10 controls the cooling device 21. Therefore, it is possible to give the cooling system 100 redundancy.

In the present embodiment, the serial bus 31 is not limited to a bus cable, and may be, for example, a wireless network.

In the present embodiment, the control system includes the notification device 41 or the communication device 51, but the control system may include both the notification device 41 and the communication device 51.

The embodiment of the present disclosure has been described above with reference to the drawings (FIGS. 1 to 9). However, the present disclosure is not limited to the above embodiment, and can be implemented in various modes without departing from the gist of the present disclosure.

Additionally, the plurality of constituent elements disclosed in the above embodiment can be appropriately modified. For example, a certain constituent element of all constituent elements shown in a certain embodiment may be added to a constituent element of another embodiment, or some constituent elements of all constituent elements shown in a certain embodiment may be removed from the embodiment.

The drawings schematically show mainly each constituent element in order to facilitate understanding of the invention, and each of the illustrated constituent elements may be different from actual one in thickness, length, number, interval, or the like for convenience of drawing creation. The configuration of each constituent element shown in the above embodiment is an example and is not particularly limited, and it goes without saying that various modifications can be made without substantially departing from the effects of the present disclosure.

The present disclosure is applicable to the field of electronic equipment control.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control system comprising:
   a first controller capable of controlling a control target; and
   a second controller capable of controlling a control target, wherein
   the first controller includes
      a first sub-controller capable of controlling the control target,
      a first transmitter capable of communicating with the control target,
      § and
      a first processor that determines execution of control for the control target by the first sub-controller in response to determining an abnormality in communication between the second controller and the control target based on failure to detect the communication between the second controller and the control target during a predetermined period, and
   the second controller includes
      a second sub-controller capable of controlling the control target, and
      a second transmitter capable of communicating with the control target.

2. The control system according to claim 1, wherein the first controller further includes a first notifier that notifies of a control status of the control target by the first sub-controller.

3. The control system according to claim 2, wherein the second controller further includes
      a second notifier that notifies of a control status of the control target by the second sub-controller,
      the second transmitter transmits a status information signal to the first controller, and
      a second processor that determines execution of control of the control target by the second sub-controller on a basis of failing to receive a response signal responding to the status information signal,
      when the first processor receives the status information signal transmitted by the second transmitter, the first processor determines standby of control of the control target by the first sub-controller.

4. The control system according to claim 3, wherein the second transmitter transmits the status information signal to the control target.

5. The control system according to claim 3, wherein the second transmitter transmits the status information signal when a standby time set on a basis of a random number elapses.

6. The control system according to claim 3, wherein the second transmitter transmits a request signal requesting a response to the first controller and receives a response signal to the request signal, and when the second transmitter does not receive the response signal within a predetermined period after transmitting the request signal, the second notifier notifies of an abnormality in the first controller.

7. The control system according to claim 1, further comprising a wireless communicator capable of communicating with external equipment, wherein the first controller or the second controller communicates with the external equipment via the wireless communicator.

8. The control system according to claim 1, wherein the first controller is capable of controlling a plurality of control targets, the second controller is capable of controlling the plurality of control targets, each of the plurality of control targets has unique identification information, the first controller specifies one control target from the plurality of control targets on a basis of the identification information, and the second controller specifies one control target from the plurality of control targets on a basis of the identification information.

9. A cooling system for cooling electronic equipment, the cooling system comprising:

a cooler that cools the electronic equipment; and the control system according to claim 1 that controls the cooler as the control target.

\* \* \* \* \*